United States Patent Office 2,965,602
Patented Dec. 20, 1960

2,965,602

CARBOXY-COPOLYMER EPOXIDE COMPOSITIONS AND THEIR PREPARATION

Darrell D. Hicks, Louisville, Ky., assignor to Devoe & Raynolds Company, Inc., a corporation of New York No Drawing. Filed Nov. 4, 1957, Ser. No. 694,122

8 Claims. (Cl. 260—45.4)

This invention, in one of its aspects, relates to thermosetting compositions. In another aspect, the invention pertains to the production of a complex resin particularly suitable for thermoset castings, molded articles and the like.

It is known that polyester resins of good elongation, or of good tensile strength, can be made, but many times the two do not go hand in hand. Polyester resins of good elongation often do not also have good tensile strength. This invention pertains to the production of resins having ester groups which have very good elongation and yet have good tensile strengths. In accordance with an embodiment of the invention, improved thermosetting compositions are produced on mixing or blending a glycidyl polyether of a polyhydric phenol or alcohol, a diacid ester of a butenedioic acid and a polyglycol and a polymerizable vinylidene compound containing a single

group. The resulting thermosetting composition can be hardened under pressure to form molded objects, or it can be hardened in the form of cast shapes. The hardening takes place without difficulty and thermoset resins having extremely desirable elongations result. In the form of cast bodies, the thermoset resins may have elongations as high as 10 to 20 percent with above average tensile strengths of as high as 6000 to 7000.

Diacid esters of butenedioic acids and polyglycols, that is, butenedioic diacid esters of polyglycols, suitable for blending or mixing with polyepoxides along with the vinyl monomers in making the thermosetting compositions of this invention are prepared by reacting two mols of a butenedioic acid or anhydride with one mol of polyethylene glycol. It has been found that when a di-butenedioic acid ester of a polyethylene glycol having an average molecular weight of 300 to 2000 is used thermoset resins are obtained having outstanding elongations not obtainable when a lower aliphatic alcohol-di-butenedioic acid ester is used. By a butenedioic acid is meant an unsaturated dibasic acid of the formula HOOCRC:CRCOOH where R is a hydrogen or methyl substituent. Included are cis-butenedioic acid (maleic acid), trans-butenedioic acid (fumaric acid), and methyl butenedioic acid (citraconic acid). It is noted, however, that the anhydride, where it exists, is preferred for use in the preparation of the di-butenedioic acid ester of the polyethylene glycol.

By "polyethylene glycol" is meant the series of colorless water soluble, nonvolatile liquid compounds having average molecular weights ranging from 200 to 6000 and having the general formula $HOCH_2(CH_2OCH_2)_xCH_2OH$ or $H(OCH_2CH_2)_nOH$. Substituted polyethylene glycols can also be used. Polyethylene glycols most generally employed are those having average molecular weights of 300 to 2000. Desirable polyethylene glycols are those having average molecular weights in the range of 200 to 800.

Glycidyl polyethers of polyhydric phenols are made from the reaction of a polyhydric phenol with epihalohydrin or glycerol dihalohydrin, and a sufficient amount of a caustic alkali to combine with the halogen of the halohydrin. Products resulting from the reaction of a polyhydric phenol with epichlorhydrin or glycerol dichlorhydrin are monomeric or straight chain polymeric products characterized by the presence of more than one epoxide group, i.e., a 1,2-epoxy equivalency greater than one. Dihydric phenols that can be used for this purpose include bisphenol, resorcinol, catechol, hydroquinone, methyl resorcinol, 2,2-bis(4-hydroxyphenyl)butane, 4,4'-dihydroxybenzophenone, bis(4-hydroxyphenyl)ethane, and 1,5-dihydroxy naphthalene. The preparation of polyepoxides from polyhydric phenols and epihalohydrin is described in U.S. Patents 2,467,171, 2,538,072, 2,582,985, 2,615,007 and 2,698,315, the proportion of the halohydrin (epichlorhydrin or glycerol dichlorhydrin) to dihydric phenol being at least about 1.2 to 1, up to around 10 to 1.

The invention is thus applicable to glycidyl polyethers of aromatic polyhydric compounds and polyhydric alcohols having weights per epoxide group of 180 to 2000. Glycidyl ethers of polyhydric alcohols are well known. These polyepoxides are made by reacting at least about two mols of an epihalohydrin with one mol of a polyhydric alcohol such as ethylene glycol, pentaerythritol, etc., followed by dehydrohalogenation according to U.S. Patent 2,581,464.

Vinylidene compounds blended with polyepoxides and diacid esters to produce the thermosetting compositions of this invention are polymerizable monomers containing at least one vinylidene group. Particularly important are vinylidene aromatic compounds, especially monofunctional vinylidene aromatic compounds, e.g., styrene, vinyl toluene, alpha-methyl styrene, the halostyrenes, etc. Also suitable are saturated alcohol esters, amides, N-alkyl amides and N,N-dialkyl amides of acrylic, methacrylic and crotonic acids; and acrylonitrile and methacrylonitrile. Saturated alcohols forming the acrylic or methacrylic acid esters of saturated alcohols include alcohols of not more than twenty carbon atoms. Likewise, in the case of N-alkyl or N,N-dialkyl acrylamides or methacrylamides, the total number of alkyl carbon atoms will not exceed twenty. In other words, preferred vinylidene monomers include alpha-beta unsaturated monocarboxylic acid esters of saturated alcohols, the acids having not more than four carbon atoms and the alcohols having not more than twenty carbon atoms; vinyl aliphatic cyanides of not more than four carbon atoms; monofunctional vinylidene aromatic compounds; and amides of alpha-beta unsaturated monocarboxylic acids of not more than four carbon atoms. Within the scope of this invention amides of these alpha-beta unsaturated acids include N-alkyl amides and N,N-dialkyl amides of the alpha-beta unsaturated acid, e.g., N-alkyl acrylamide, wherein the number of N-carbon atoms does not exceed twenty. It is seen that in the case of N,N-dialkyl amides the alkyl chains will be shorter than in the case of N-alkyl amide since in either case the total number of carbon atoms will not exceed twenty.

Thus, preferred vinylidene compounds are styrene, vinyl toluene, isopropenyl toluene, the various dialkyl styrenes, ortho-, meta- and para-chlorostyrenes, bromo styrenes, fluoro styrenes, cyano styrenes, vinyl naphthalene, the various alpha-substituted styrenes, e.g., alpha-methyl styrenes, alpha-methyl para-methyl styrenes, as well as various di-, tri- and tetrachloro, bromo and fluoro styrenes, and acrylic, methacrylic and crotonic esters of saturated alcohols. These esters will be referred to as alkyl esters of acrylic or methacrylic acid. They include the methyl, ethyl, propyl, isopropyl, N-butyl, isobutyl, sec-butyl, tert-butyl, amyl, hexyl, heptyl octyl decyl, dodecyl, etc. esters of acrylic, methacrylic and crotonic acids. The alkyl esters of acrylic, methacrylic or crotonic acids contain no more than twenty alkyl carbon atoms and preferably not over twelve carbon atoms.

Other known vinylidene monomers can, of course, be used in the preparation of the thermosetting compositions of this invention, such as monofunctional vinyl heterocyclic compounds, for instance, N-vinyl carbazole, vinyl pyridine, vinyl furane, vinyl cyclohexane, vinyl dibenzofuran; monovinyl ethers, for example, ethyl vinyl ether, ethyl methallyl ether, vinyl butyl ether, phenyl vinyl ether, methyl vinyl ether, and others of not over twenty carbon atoms; and monovinyl ketones, for instance, methyl vinyl ketone, methyl allyl ketone, ethyl vinyl ketone and the like of not over twenty carbon atoms. Also contemplated are the vinyl halides such as vinyl chloride, the various vinylidene compounds, vinylidene chloride, vinylidene bromide.

In the preparation of thermosetting compositions according to this invention, the diacid ester of a butenedioic acid and a polyglycol is prepared preferably from the anhydride, and the resulting diacid ester, glycidyl polyether and vinylidene monomer are blended or mixed. When the butenedioic acid anhydride is used and temperatures below esterification temperatures can be employed, the ester can be readily made from two mols of anhydride and one mol of polyethylene glycol. Accordingly, the anhydride is a preferred reactant inasmuch as there will be extensive polymeric polyester formation when one mol of polyethylene glycol is reacted with two mols of a butenedioic acid.

In the thermosetting composition, while equivalent amounts of glycidyl polyether and diacid ester are desired (one mol of diacid ester per mol of diglycidyl polyether) either the diacid ester or the glycidyl polyether can be used in excess, the amount being governed by properties and cost considerations. Normally an amount of from about 0.7 to about 2 epoxide groups of glycidyl polyether is used per carboxyl group of diacid ester. The vinylidene compound desirably is present in an amount of from twenty to seventy percent by weight on the total composition.

Whereas similar prior art processes normally only use a peroxide catalyst which promotes polymerization, this invention involves the use of two catalysts, one to promote the carboxy-epoxy reaction between the polyepoxide and the dibutenedioic acid ester of the polyethylene glycol and the other to promote vinyl copolymerization between double bonds of di-ester and vinylidene monomer. Thus it is desirable to carry out the two reactions concomitantly.

Included among catalysts for promoting the polymerization of the dibutenedioic acid ester of polyethylene glycol with the vinylidene monomer are hydrogen peroxide, various organic peroxides, for example, ascaridol, acetyl and benzoyl peroxides, dibutyryl and dilauryl peroxides, caprylyl peroxide, as well as partially oxidized aldehydes which can contain peroxides, urea-peroxide, succinic acid peroxide, and the like. Other peroxides are fatty acid peroxides, such as coconut oil peroxides, stearic peroxide, lauric peroxide, and oleic peroxide. Also intended are alcoholic peroxides such as tertiary butyl hydroperoxides and other peroxides such as cumene hydroperoxide, tertiary butyl perbenzoate, hydroxyheptyl peroxide, and chlorobenzoyl peroxide.

A particularly important embodiment of this invention is the use of an activator for the epoxy-carboxy reaction since much better results are obtained thereby. These epoxy-carboxy catalysts are generally basic materials and are well known in the art, for example, amines, amine salts, quaternary ammonium hydroxides and quaternary ammonium salts. Any of the catalysts which are activators for epoxy-carboxy reactions can be used. However, since primary and secondary amines enter into the reaction, preferred catalysts are tertiary amines, tertiary amine salts and quaternary ammonium compounds, e.g., quaternary ammonium hydroxide, and quaternary ammonium salts. Examples are trimethyl amine, dimethylethyl amine, triethyl amine, ethyl dipropyl amine, benzyl trimethyl ammonium hydroxide, benzyltrimethyl ammonium chloride, benzyltrimethyl ammonium acetate, benzyltriethyl ammonium formate, tripropylbenzyl amonium chloride, ethyl pyridine chloride, benzyl dimethyl ammonium hexoate, alpha-methylbenzyldimethyl ammonium 2-ethyl hexoate, etc.

Thermoset resins prepared from thermosetting compositions in accordance with this invention normally are prepared by first heating the thermosetting composition using the catalysts to form a gel and subsequently heating the gel at a higher curing temperature to bring about a maximum amount of cross-linking. Gel temperatures desirably are in the range of 65° C. to 90° C., the product, in the case of castings, being heated slowly to avoid bubbling or foaming, generally several hours depending upon the thickness of the mold. The gel is then subsequently further heated to bring about maximum cross-linking at curing temperatures of 120° C. to 150° C. for two to four hours, preferably 150° C. for three hours.

In order more fully to illustrate the invention, the following examples are included. The examples are for the purposes of illustration only and it is intended that no undue limitation be read into the invention by reference to the examples and the discussion thereof.

In the examples which follow, polyepoxides vinylidene monomers and diacid esters of maleic acid and polyethylene glycols are combined in the presence of catalysts, are poured into a mold and are cured to produce castings with outstanding physical properties. The alpha-hardness test employed in determining the hardness values of the castings is an indentation hardness eliminating residual indentation of the usual Rockwell hardness test.

The mold used in the preparation of castings is made by wrapping two 8″ by 12″ by ¼″ glass plates with heavy duty cellophane so that one side of each plate is free of wrinkles. These plates are then assembled, smooth side inward, into a mold by separating the plates with ⅛″ aluminum spacers to adjust the cavity thickness using polyvinyl chloride-acetate plastic tubing as a gasket on three of the four edges of the glass plates. The two glass plates are then clamped together using 6 C clamps.

The polyepoxides employed in the following examples are prepared in the manner described in U.S. Patents 2,615,007, 2,615,008, 2,582,985, and 2,581,464, by the condensation of varying proportions of epichlorhydrin to bisphenol or polyhydric alcohol and subsequent dehydrohalogenation with sodium hydroxide. The table which follows indicates the ratio of epichlorhydrin to bisphenol or alcohol used to prepare the polyepoxides. In the examples which follow, the polyepoxides will be referred to by their epoxide equivalency, e.g., a polyepoxide with an epoxide equivalent of 460 will be called Epoxide 460 and the epoxide made from epichlorhydrin and 1,5-pentanediol will be referred to in the examples as Epoxide 148.

| Epoxide No. | Ratio (mols) | | Epoxide Equivalent |
| --- | --- | --- | --- |
| | Epichlorhydrin | Bisphenol | |
| 195 | 10.0 | 1.0 | 195 |
| 460 | 1.57 | 1.0 | 460 |
| 950 | 1.21 | 1.0 | 950 |
| | Epichlorhydrin | 1,5-Pentanediol | |
| 148 | 10.0 | 1.0 | 148 |

All parts in the following examples are intended to mean parts by weight.

Example 1

A diacid ester of maleic anhydride and a polyethylene glycol having a molecular weight of 400 is prepared by charging into a one liter, three necked flask equipped with an agitator, thermometer and reflux condenser, 196.1 parts (two mols) of maleic anhydride and 400 parts (one mol) of polyethylene glycol. The reaction mixture is heated to 120–130° C. and is maintained at this temperature for a period of two hours at which time the reaction is complete. A quantitative yield of the straw colored viscous half ester having a weight per carboxyl group of 298 is obtained.

In a suitable container, 60.8 parts of Epoxide 460 (0.13 epoxide equivalent) and 100.0 parts (fifty percent based on the total weight of the three reactants) of styrene containing 500 p.p.m. of tertiary butyl catechol are combined and heated on a hot plate with agitation until all of the Epoxide 460 is in solution. The solution is cooled to room temperature after which 39.2 parts (0.13 carboxyl equivalent) of the dimaleic ester of the polyethylene glycol of this example, together with 2.0 parts of a 50/50 paste of benzoyl peroxide and tricresyl phosphate and 2.0 parts of a sixty percent aqueous solution of benzyltrimethyl ammonium chloride are stirred into the mixture. The resulting solution is poured into the aforedescribed mold, which has been preheated for thirty minutes at 75° C. The filled mold is heated in a 75° C. oven until a gel is obtained (approximately two hours), after which time the mold is heated for three hours at 150° C. The casting obtained has the following outstanding physical properties:

Tensile strength _____ 4,900 pounds per square inch.
Flexural strength ____ 8,700 pounds per square inch.
Elongation _____ 15 to 20 percent.
Impact strength _____ 0.39 foot pounds per inch of notch.
Alpha hardness _____ 86.

Example 2

Following the procedure described in Example 1, 23.6 parts (0.08 carboxyl equivalent) of the diacid ester of maleic acid and a polyethylene glycol with a molecular weight of 400 prepared in Example 1, 76.4 parts (0.08 epoxide equivalent) of Epoxide 950 and 100.0 parts (fifty percent based on the total weight of the three reactants) of styrene containing 500 p.p.m. of tertiary butyl catechol are combined together with 2.0 parts of a 50/50 paste of benzoyl peroxide and tricresyl phosphate and 2.0 parts of a sixty percent aqueous solution of benzyltrimethyl ammonium chloride. The resultant solution is poured into the aforedescribed mold, preheated for thirty minutes at 100° C., and the filled mold is heated in a 100° C. oven until a gel is obtained (approximately two hours), after which time it is baked in a 150° C. oven for three hours. The casting obtained has the following physical properties:

Tensile strength _____ 6,900 pounds per square inch.
Elongation _____ 4 to 5 percent.
Flexural strength ____ 12,000 pounds per square inch.
Impact strength _____ 0.25 foot pounds per inch of notch.
Alpha hardness _____ 102.

Example 3

Following the procedure of Example 1, 39.2 parts (0.13 carboxyl equivalent) of the diacid ester of Example 1, 60.8 parts (0.13 epoxide equivalent) of Epoxide 460 and 100.0 parts (fifty percent based on the total weight of the three reactants) of a 50/50 mixture of methyl acrylate and methyl methacrylate are combined together with 2.0 parts of a 50/50 paste of benzoyl peroxide and tricresyl phosphate and 2.0 parts of a sixty percent aqueous solution of benzyltrimethyl ammonium chloride. The mixture is poured into the previously described mold which has been pre-heated for thirty minutes at 100° C. The mold is heated in a 100° C. oven until a gel is obtained, approximately two hours, after which it is baked in a 150° C. oven for a period of three hours to obtain a tough and flexible casting.

Example 4

As described in the procedure of Example 1, 12.8 parts (0.043 carboxyl equivalent) of the diacid ester of Example 1, 19.8 parts (0.043 epoxide equivalent) of Epoxide 460 and 17.5 parts (thirty-five percent based on the total weight of the three reactants) of styrene containing 500 p.p.m. of tertiary butyl catechol are combined with 0.5 part of a paste consisting of fifty percent benzoyl peroxide and fifty percent tricresyl phosphate and 0.5 part of a sixty percent aqueous solution of benzyltrimethyl ammonium chloride. The solution is poured into the previously described mold (pre-heated at 75° C. for thirty minutes) and the filled mold is placed in a 75° C. oven until a gel results (approximately one and a half hours), after which time the mold is baked in a 150° C. oven for three hours. The casting obtained is clear, very tough and hard, and extremely flexible.

Example 5

According to the procedure described in Example 1, 7.7 parts (0.026 carboxyl equivalent) of the diacid ester of Example 1, 24.8 parts (0.026 epoxide equivalent) of Epoxide 950, 17.5 parts (thirty-five percent based on the total weight of the three reactants) of styrene containing 500 p.p.m. tertiary butyl catechol are combined with 0.5 part of a paste consisting of fifty percent benzoyl peroxide and fifty percent tricresyl phosphate and 0.5 part of a sixty percent aqueous solution of benzyltrimethyl ammonium chloride. The mixture is poured into an aluminum cup which is covered to prevent the excape of volatile material and is heated in a 75° C. oven until a gel results (about two hours), after which it is baked for three hours in a 150° C. oven to obtain a clear casting which is very tough, hard, and flexible.

Example 6

In accordance with the procedure of Example 1, a diacid ester of maleic acid and a polyethylene glycol having a molecular weight of 600 is prepared from the reaction of two mols (196 parts) of maleic anhydride and one mol (600 parts) of the polyethylene glycol. The diacid ester with a weight per carboxyl group of 396, is a dark amber, viscous liquid and is obtained in quantitative yield.

As described in the procedure of Example 1, 46.2 parts (0.12 carboxyl equivalent) of the diacid ester of this example, 53.8 parts (0.12 epoxide equivalent) of Epoxide 460 and 100.0 parts (fifty percent based on the total weight of the three reactants) of styrene containing 500 p.p.m. of tertiary butyl catechol are mixed with 2.0 parts of a 50/50 paste of benzoyl peroxide and tricresyl phosphate and 2.0 parts of a sixty percent aqueous solution of benzyltrimethyl ammonium chloride. The mixture is poured into the previously described mold, which has been pre-heated for thirty minutes at 75° C., and the filled mold is heated in a 75° C. oven until a gel results (approximately eighteen hours), after which it is baked in a 150° C. oven for three hours to obtain a casting with these physical properties:

Tensile strength ____ 3,900 pounds per square inch.
Elongation _____ 30 percent.
Flexural strength ____ 7,200 pounds per square inch.
Impact strength _____ 0.42 foot pounds per inch of notch.
Alpha hardness _____ 76.

Example 7

Following the procedure of Example 1, 38.0 parts (0.096 carboxyl equivalent) of the diacid ester of Example 6, 92.0 parts (0.096 epoxide equivalent) of Epoxide 950 and 70.0 parts (thirty-five percent based on the total weight of the three reactants) of styrene containing 500 p.p.m. tertiary butyl catechol are combined with 2.0 parts of a 50/50 paste of benzoyl peroxide and tricresyl phosphate and 2.0 parts of a sixty percent aqueous solution of benzyltrimethyl ammonium chloride. The mixture is poured into the previously described mold (preheated for thirty minutes at 75° C.), and the filled mold is heated in a 75° C. oven until a gel is obtained (approximately sixteen and a half hours), after which it is baked at 150° C. for three hours to result in a clear casting with the following physical properties:

Tensile strength _____ 6,000 pounds per square inch.
Elongation _____ 12 to 13 percent.
Flexural strength ____ 9,500 pounds per square inch.
Impact strength _____ 0.25 foot pounds per inch of notch.
Alpha hardness _____ 98.

Example 8

In a suitable container, following the procedure described in Example 1, 46.2 parts (0.12 carboxyl equivalent) of the diacid ester of maleic acid and a polyethylene glycol with a molecular weight of 600 as prepared in Example 6, 53.8 parts (0.12 epoxide equivalent) of Epoxide 460 and 100.0 parts (fifty percent based on the total weight of the three reactants) of methyl methacrylate are combined together with 2.0 parts of a 50/50 paste of benzoyl peroxide and tricresyl phosphate and 2.0 parts of a sixty percent aqueous solution of benzyltrimethyl ammonium chloride. The mixture is poured into an aluminum cup, which is placed inside a closed container to prevent the escape of volatile material. The container is heated in a 75° C. oven until a gel is obtained (approximately seventeen and a half hours), after which it is baked at 150° C. for three hours to obtain a tough and very hard casting which has flexibility properties slightly inferior to the casting of Example 6.

Example 9

Following the procedure described in Example 1, 38.0 parts (0.096 carboxyl equivalent) of the diacid ester of Example 6, 92.0 parts (0.096 epoxide equivalent) of Epoxide 950 and 70.0 parts (thirty-five percent based on the total weight of the three reactants) of vinyl toluene are combined with 2.0 parts of a 50/50 paste of benzoyl peroxide and tricresyl phosphate and 2.0 parts of a sixty percent aqueous solution of benzyltrimethyl ammonium chloride. The resulting mixture is poured into the previously described mold, pre-heated at 75° C. for thirty minutes, and is heated in a 75° C. oven until a gel results (approximately sixteen and a half hours), after which time it is baked in a 150° C. oven for three hours. A tough, hard casting results which resembles closely the casting of Example 6.

Example 10

Following the procedure of Example 1, 15.1 parts (0.038 carboxyl equivalent) of the diacid ester of Example 6, 17.5 parts (0.039 epoxide equivalent) of Epoxide 450, 17.5 parts (thirty-five percent based on the total weight of the three reactants) of sytrene containing 500 p.p.m. tertiary butyl catechol are combined with 0.5 part of a 50/50 paste of benzoyl peroxide and tricresyl phosphate and 0.5 part of a sixty percent aqueous solution of benzyltrimethyl ammonium chloride. The mixture is poured into an aluminum dish which is placed inside a closed container to prevent the excape of volatile material. The container is heated in a 75° C. oven until a gel of the mixture results (approximately sixteen and a half hours), after which it is baked in a 150° C. oven for three hours. The clear casting obtained is tough, has good hardness, and is quite flexible.

Example 11

In a suitable container, following the procedure described in Example 1, 7.3 parts (0.018 carboxyl equivalent) of the diacid ester of Example 6, 17.7 parts (0.019 epoxide equivalent) of Epoxide 950, 25.0 parts (fifty percent based on the total weight of the three reactants) of styrene containing 500 p.p.m. tertiary butyl catechol, 0.5 part of a 50/50 paste of benzoyl peroxide and tricresyl phosphate and 0.5 part of a sixty percent aqueous solution of benzyltrimethyl ammonium chloride are combined and poured into an aluminum dish which is placed inside a closed container to prevent the escape of volatile material. The container is heated in a 75° C. oven until a gel results (approximately seventeen hours), after which it is baked in a 150° C. oven to obtain a casting which is very tough and hard and has excellent flexibility.

The preceding examples clearly show the advantageous elongation properties obtainable in accordance with this invention. The products have good elongation properties, yet, as the examples show, tensile strengths are still good. To further illustrate the invention, properties of products obtained by the foregoing examples can be compared with maleic half esters of butyl alcohol and 2-ethylhexyl alcohol. Compositions containing fourteen percent of a butyl alcohol-half ester of maleic acid, thirty-six percent Epoxide 460 and fifty percent styrene have elongations of four to five percent, whereas the corresponding product made in accordance with Example 1 has an elongation of fifteen to twenty percent. On the other hand, a composition made from sixteen percent of a 2-ethylhexyl alcohol-half ester of maleic acid, thirty-four percent Epoxide 460 and fifty percent styrene also has an elongation of four to five percent as compared with thirty percent with the product of Example 6.

It is understood that many compositions are obtainable by the practice of this invention. By variations in manipulations, a wide variety of shaped objects, molded articles and castings can be made and in addition forms can be prepared which can be milled to produce various other articles. It is the purpose of this invention to provide means for the production of resins which lend themselves to these end products, particularly those requiring remarkable tensile properties. It is not intended that the invention should be limited by modifications and variations in the process of the invention which will be effected in particular instances by those requiring products having specific uses. Modifications and variations which occur to those skilled in the art are deemed to be within the scope of this invention.

What is claimed is:

1. A thermosetting resinous composition comprising in admixture (1) a glycidyl polyether of a polyhydric compound selected from the group consisting of polyhydric alcohols and phenols having at least two phenolic hydroxyl groups; (2) a butenedioic acid ester of a polyethylene glycol having the formula HOOCRC
=CRCOOCH$_2$(CH$_2$OCH$_2$)$_x$CH$_2$OOCRC=CRCOOH wherein R is selected from the group consisting of hydrogen and methyl substituents and $x$ is a whole number such that the polyethylene glycol has a weight of 200 to 6000; and (3) a vinylidene compound selected from the group consisting of styrene, the methyl styrenes, the halo styrenes, vinyl naphthalene, acrylonitrile, methacrylonitrile, N-alkyl and N,N-dialkyl amides of acids selected from the group consisting of acrylic and methacrylic acids, the number of carbon atoms in each N-alkyl radical not exceeding twenty, alkyl esters of acids selected from the group consisting of acrylic and methacrylic acids, the number of carbon atoms in the alkyl group not exceeding twenty, vinyl pyridine, vinyl furane, vinyl cyclohexane, monovinyl ketones of not over twenty carbon atoms, and vinyl halides, said mixture containing one equivalent polyepoxide per carboxyl equivalent acid ester and from twenty to seventy percent monomer by weight based on the total composition, considering an equivalent polyepoxide as the weight of epoxide in grams per epoxide group and a carboxyl equivalent acid ester as the weight in grams of acid ester per carboxyl group.

2. The composition of claim 1 wherein the polyether is a glycidyl polyether of a polyhydric alcohol, said polyether having an epoxide equivalent of 140 to 1500, and wherein the vinylidene compound is a mixture of styrene and alkyl ester of methacrylic acid having not more than twenty alkyl carbons.

3. A process for preparing thermoset resins which comprises (a) mixing (1) a glycidyl polyether of a polyhydric compound selected from the group consisting of polyhydric alcohols and phenols having at least two phenolic hydroxyl groups; (2) a butenedioic acid ester of a polyethylene glycol having the formula

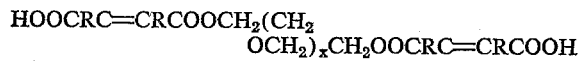

wherein R is selected from the group consisting of hydrogen and methyl substituents and $x$ is a whole number such that the polyethylene glycol has a weight of 300 to 2000; and (3) a vinylidene compound selected from the group consisting of styrene, the methyl styrenes, the halo styrenes, vinyl naphthalene, acrylonitrile, methacrylonitrile, N-alkyl and N,N-dialkyl amides of acids selected from the group consisting of acrylic and methacrylic acids, the number of carbon atoms in each N-alkyl radical not exceeding twenty, alkyl esters of acids selected from the group consisting of acrylic and methacrylic acids, the number of carbon atoms in the alkyl group not exceeding twenty, vinyl pyridine, vinyl furane, vinyl cyclohexane, monovinyl ketones of not over twenty carbon atoms, and vinyl halides, and (b) heating the mixture at a temperature above 60° C. to react the polyepoxide with the butenedioic acid ester of the polyethylene glycol while concomitantly polymerizing the butenedioic acid ester with the vinylidene compound, considering an equivalent polyepoxide as the weight of epoxide in grams per epoxide group and a carboxyl equivalent acid ester as the weight in grams of acid ester per carboxyl group.

4. The process of claim 3 wherein the reaction is carried out in the presence of a peroxide polymerization catalyst and a carboxy-epoxy catalyst selected from the group consisting of tertiary amines and their salts, quaternary ammonium hydroxides and quaternary ammonium salts.

5. The process of claim 4 wherein the glycidyl polyether has an epoxide equivalent of 400 to 1000, and wherein the vinylidene compound is a mixture of vinyl toluene and an alkyl ester of acrylic acid having not more than twelve alkyl carbon atoms.

6. The process of claim 4 wherein the butenedioic acid ester is a di-maleic acid ester of polyethylene glycol, said glycol having a molecular weight of 200 to 800 and wherein the vinylidene monomer is a vinyl aromatic compound.

7. The process of claim 6 wherein the vinyl aromatic compound is styrene.

8. The process of claim 6 wherein the vinyl aromatic compound is vinyl toluene.

References Cited in the file of this patent

UNITED STATES PATENTS

| | | |
|---|---|---|
| 2,532,498 | Hoppens | Dec. 5, 1950 |
| 2,826,562 | Shokal | Mar. 11, 1958 |
| 2,859,199 | Parker | Nov. 4, 1958 |

FOREIGN PATENTS

| | | |
|---|---|---|
| 734,848 | Great Britain | Aug. 10, 1955 |